(No Model.) 2 Sheets—Sheet 2.
J. J. PFENNINGER.
BAKER'S OVEN.
No. 473,018. Patented Apr. 19, 1892.
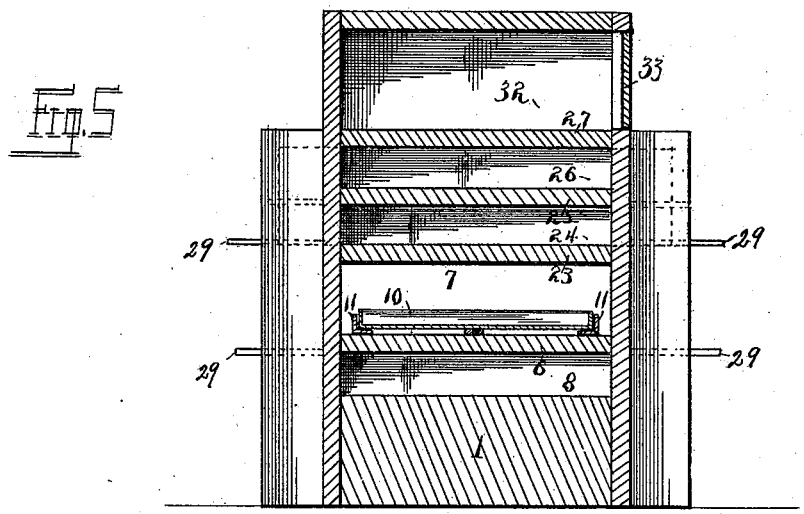
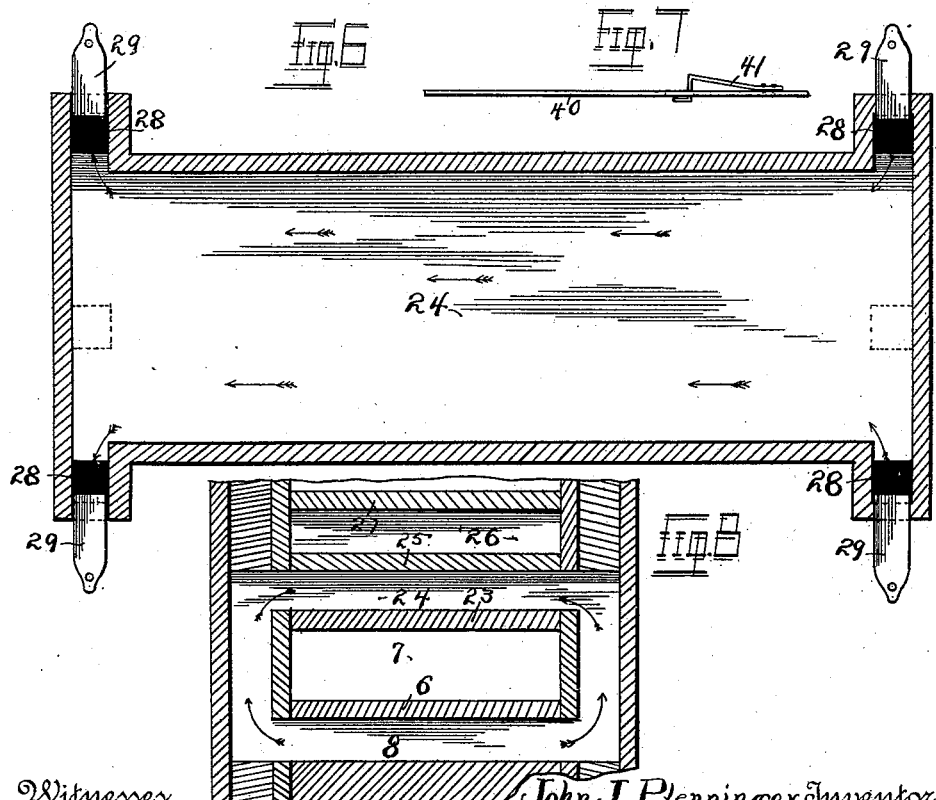
Witnesses
A. A. Eicks
Ed. E. Longan
John J. Pfenninger Inventor
By his Attorneys Higdon & Higdon

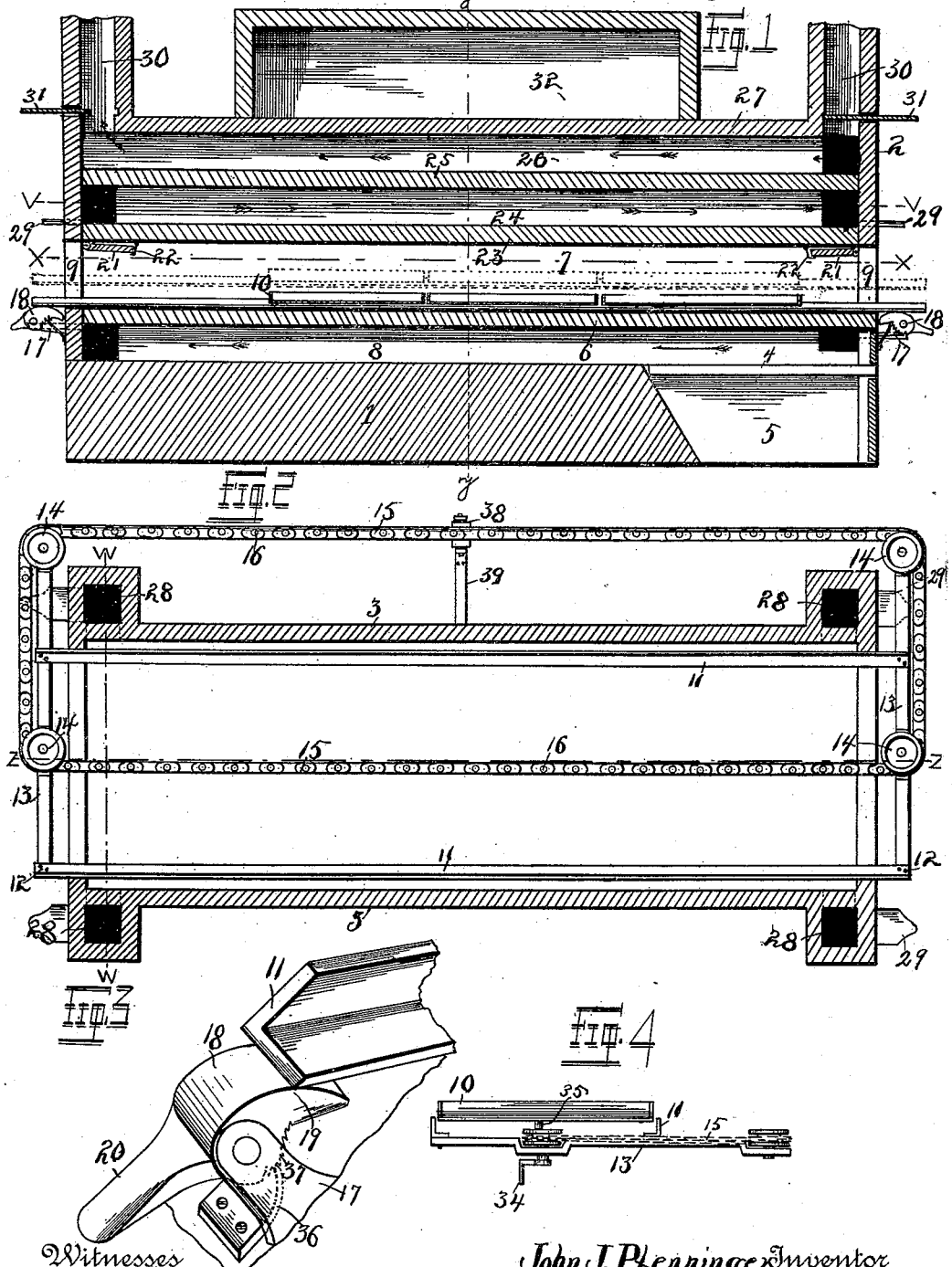

UNITED STATES PATENT OFFICE.

JOHN JACOB PFENNINGER, OF ST. LOUIS, MISSOURI.

BAKER'S OVEN.

SPECIFICATION forming part of Letters Patent No. 473,018, dated April 19, 1892.

Application filed October 21, 1891. Serial No. 409,393. (No model.)

*To all whom it may concern:*

Be it known that I, JOHN JACOB PFENNINGER, of the city of St. Louis and State of Missouri, have invented certain new and useful Improvements in Bakers' Ovens, of which the following is a full, clear, and exact description, reference being had to the accompanying drawings, forming a part hereof.

My invention relates to improvements in bakers' ovens; and it consists in the novel arrangement and combination of parts, as will be more fully hereinafter described, and designated in the claims.

In the drawings, Figure 1 is a vertical longitudinal mid-section of my complete invention, taken on the line $z\ z$ of Fig. 2. Fig. 2 is a horizontal section taken on the line $x\ x$ of Fig. 1. Fig. 3 is a perspective view of one of the tracks with parts broken away, especially showing the mechanism for elevating or lowering the same. Fig. 4 is a detail view of the mechanism for operating the endless chain which carries the baking-pans. Fig. 5 is a transverse vertical mid-section taken on the line $y\ y$ of Fig. 1. Fig. 6 is a horizontal longitudinal section taken on the line $v\ v$ of Fig. 1. Fig. 7 is a detail view of an operating-rod for pulling out the baking-pans. Fig. 8 is a vertical transverse section taken on the line $w\ w$ of Fig. 2.

The object of my invention is to construct an oven for especially baking crackers, biscuits, bretzels, and like articles of food, although I may use the same for general baking purposes.

I will give a further description of the use and operation of my invention in connection with a mechanical description thereof.

Referring to the drawings, 1 indicates the base or foundation walls of the oven, 2 the end exterior walls of the same, and 3 the side walls. It may be noted in this connection that I may so construct my oven that the same may be portable or stationary.

4 indicates a series of grate-bars on which the fuel is placed, and 5 indicates the ash-pit.

Located above the series of grate-bars 4 and at a suitable distance from the wall 1 is the bottom floor 6 of the baking-compartment 7. The floor 6 is composed of fire-brick or any other suitable material and extends across the oven, as illustrated in Figs. 1, 5, and 8, but leaving a space 8 between it and the base-wall 1 for the passage of the hot air, as illustrated in Fig. 1. The end walls 2 are provided with openings 9 for the insertion and removal of the baking-pans 10.

Resting on the bottom floor 6 are L-shaped tracks 11, on which the baking-pans 10 rest and are adapted to slide. The tracks 11 have secured to the ends thereof by means of bolts or rivets 12 cross-pieces 13, and pivotally mounted on said cross-pieces 13 are chain-wheels 14, and mounted on said chain-wheels 14 is an endless chain 15, provided with a series of holes 16. Two of the chain-wheels 14 are located one at each end of the baking-chamber 7 and the other two are located alongside thereof at the ends of the outer wall of the baking-chamber, such arrangement permitting one lap of the endless chain 15 to pass through the baking-chamber 7 and the other lap to pass outside thereof.

The tracks 11 are elevated and lowered in the following manner: Secured to the end walls 2 in any suitable and mechanical manner are brackets 17, and pivotally mounted on said brackets are levers 18. Said levers 18 are provided with rounded arms 19, which may normally rest against the rails 11 or on the cross-bars 13, secured to said rails. Secured to each end of the oven in the manner as hereinbefore described are two levers, such as 18. Said levers may be mounted upon a common shaft and may be operated simultaneously, (which mounting is not illustrated,) or they may be operated independently of each other, as illustrated. By the operator pressing downwardly on the arms 20 of said levers the track-rails 11 may be elevated simultaneously or independently of each other. This construction is absolutely necessary for the following reasons: For instance, if the baking-pans 10 are located too near the floor 6 and are becoming too hot for the proper baking of the food it becomes necessary to elevate the pans from the floor 6, and thus decrease the temperature of said pans.

21 indicates doors, which are hinged in any suitable and mechanical manner to any suitable and convenient portion of the baking-oven and are adapted to swing downwardly and close the openings 9, and thus restrain the heat in the baking-chamber 7. Said doors may be elevated and secured in said elevated position by means of hooks 22, as illustrated in Fig. 1, and in fact I always bake with the doors elevated; but I close the same when I first start the fire in the baking-oven, so as to restrain the heat in the baking-chamber and make the same warm before I commence to bake.

23 indicates the top wall of the baking-chamber, which extends entirely across the baking-oven. Said wall is composed of any suitable material.

Located directly above the floor 23 is a smoke and hot-air passage 24, and located directly above the smoke and hot-air passage 24 is a wall 25, similar to the wall 23, and located above said wall 25 is a similar smoke and hot-air passage 26, and covering said hot-air passage 26 is the top wall of the furnace 27.

The passages 8, 24, and 26 are designed for conveying or conducting the products of combustion and hot air throughout the baking-oven, to which end they are connected by flues now to be described.

Located at each corner of the baking-oven is a flue 28 of the construction as illustrated in Figs. 2, 5, 6, and 8. Said flues 28 are in communication with the hot-air passages 8, 24, and 26, the rear flues, however, having no direct communication with the passage 26 at that end. (See Fig. 1.) The object of said flues 28 is to regulate and control the temperature of the baking-oven. Said flues 28 are provided with cut-off dampers 29, as illustrated in Fig. 6, and these dampers may enter into the flues from the sides of the oven or from the ends, as shown.

Located at each end of the baking-oven and in the central portions thereof is a combustion-flue 30; or, in other words, there are two combustion-flues, such as 30, one located at each end of the baking-oven. Said combustion-flues 30 are provided with dampers 31. The combustion-flues 30 communicate with the smoke and hot-air passage 26, and the one at the front end of the baking-oven communicates directly with the fire through the medium of the flues 28 at the front and the front end of passage 26—that is to say, there will be a substantially direct upward communication between the fire and the front combustion-flue 30. Said combustion-flues 30 extend beyond the top wall 27 of the baking-oven to any suitable and convenient distance, as illustrated in Fig. 1.

Located above the wall 27 is a drying-chamber 32, in which the baked material is placed to be thoroughly dried out after the same has been baked. Said chamber 32 is provided with a door 33 for the insertion and removal of the baked or cooked substance. Said drying-chamber 32 is warmed by the heat that is radiated from the top wall 27 of the baking-oven.

It may be noted that I can construct my baking-oven of any size; but the one now used by me is about five feet in width, exclusive of the width of the flues, and about ten feet in length. The baking-oven should be made sufficiently long as to accommodate the insertion of quite a number of baking-pans, such as 10, in the baking-compartment 7 thereof. One of the chain-wheels 14 has secured thereto a crank 34, by which the same may be rotated, and consequently revolve or operate the endless chain 15 for the removal and carrying through the baking-chamber the baking-pans 10. Each of the baking-pans 10 is provided with a lug 35, as hereinbefore stated, which is adapted to be inserted in the perforations 16 of the endless chain 15.

By means of the combustion-flues 30 and the flues 28 the temperature of the baking-oven may be controlled in a manner as I will now proceed to describe. When the fire is first started in the baking-oven, and in order to heat the same throughout, I close the dampers 31 and 29 of the flues located at the right hand of Fig. 1 or the front of the baking-oven. By closing said dampers the heat and products of combustion are not led directly out of the baking-oven through the front flues, but are caused to pass throughout the passages 8, 24, and 26—that is to say, they pass backwardly through passage 8, then upwardly into the passage 24 through the rear flues 28, then forwardly through the passage 24, then upwardly into the passage 26 through the front flues 28, and then backwardly through the passages 26. After traversing the flues and passages, as described, the hot air and products of combustion find an exit through the rear combustion-flue 30 if its damper be left open. Should the baking-oven become too warm, I reverse this operation and close the dampers of the rear flues and open the dampers of the front flues, thus permitting the products of combustion and hot air to pass directly out of the front flues without passing throughout the baking-oven.

Referring to the mechanism for elevating or lowering the track-rails which support the baking-pans, the levers 18, which effect such elevation or lowering of said rails, are held in their desired adjustment by means of spring-pawls 36, which are adapted to engage with the teeth 37 of said levers.

The endless chain 15 is supported on the outside of the furnace by means of a roller 38, which is mounted upon a shaft 39, thus preventing the said chain from sagging.

40 indicates an operating-rod for the removal of the baking-pans without operating the endless chain 15, carried by the same. Said operating-rod 40 is provided with a series of spring-hooks 41. (See Fig. 7 for illustration.) When the operating-rod 40 is inserted under the pans, the spring-hooks 41 are depressed until they reach the end of the pans, and then they spring upwardly against the end of the pans, and by the proper manipulation of said rod the baking-pans may be elevated off of the chain and removed.

It may be noted that each of the flues 28 is provided with two dampers, such as 29, one located near the bottom of said flue and the other near the top thereof. These dampers are designed for the proper regulation of the heat throughout the baking-oven, it being premised that said dampers 29 and 31 are both used to effect the above-stated purpose.

Having fully described my invention, what I claim is—

1. A baking-oven having a baking-chamber 7, track-rails for supporting the series of baking-pans located within said chamber, cross-pieces 13, secured to the terminal portion of said track-rail, chain-wheels 14, mounted on said cross-pieces, an endless chain 15, provided with a series of perforations 16, mounted on said chain-wheels and adapted to pass through said baking-chamber beneath the baking-pans, means for securing said baking-pans to said endless chain, means for rotating said endless chain, and means for elevating said track-rails, substantially as set forth.

2. In a baking-oven, a baking-chamber the openings whereof are provided with doors 21, L-shaped tracks located in said baking-chamber, baking-pans 10, provided with lugs 35 and located on said tracks, cross-pieces 13, secured to said tracks, chain-wheels 14, mounted on said cross-pieces, a crank 34, secured to one of said chain-wheels for rotating the same, an endless chain 15, provided with perforations 16 for the reception of lugs 35, mounted on said chain-wheels, and levers 18 for elevating said tracks simultaneously or independently of each other, substantially as set forth.

3. In a baking-oven, a baking-chamber the openings whereof are provided with doors 21, L-shaped tracks located in said baking-chamber, baking-pans 10, provided with lugs 35, located on said rails, cross-pieces 13, secured to said rails, chain-wheels 14, mounted on said cross-pieces, a crank 34, secured to one of said chain-wheels for rotating the same, an endless chain 15, provided with perforations 16 for the reception of lugs 35, mounted on said chain-wheels, levers 18 for elevating said rails simultaneously or independently of each other, and spring-pawls 36 for holding said levers in their desired adjustment, substantially as set forth.

4. In a baker's oven, the combination of carrying-wheels suitably mounted one at each end of the baking-chamber and one at each end of one of the outer sides of the chamber, with an endless chain guided on said wheels, whereby one lap of said chain is caused to pass inside the baking-chamber and the other lap outside thereof, substantially as shown and described.

5. A baking-oven having a baking-chamber 7, a hot-air passage 8, located beneath the same, a series of hot-air passages, such as 24 and 26, located above said chamber, two flues 28, and a combustion-flue located at each end of said oven and in communication with said hot-air passages, cut-off dampers located in said flues, a drying-chamber 32, located above said baking-oven, L-shaped track-rails for supporting the series of baking-pans located within the baking-chamber, baking-pans 10, provided with lugs 35, located on said rails, cross-pieces 13, secured to the terminal portions of said rails, chain-wheels 14, mounted on the said cross-pieces, a crank 34, secured to one of said chain-wheels for rotating the same, an endless chain 15, provided with a series of perforations 16 for the reception of lugs 35 of the baking-pans, a shaft 39, carrying a roller 38 for supporting the portion of said chain located on the outside of the baking-oven, levers 18, provided with rounded arms 19, and a series of ratchet-teeth 37 for elevating or lowering the said rails simultaneously or independently of each other, and spring-pawls 36 for holding said levers in their desired adjustment, substantially as set forth.

In testimony whereof I affix my signature in presence of two witnesses.

JOHN JACOB PFENNINGER.

Witnesses:
BENJ. J. KLENE,
ED. E. LONGAN.